United States Patent
Fuchs et al.

(10) Patent No.: US 9,260,594 B2
(45) Date of Patent: Feb. 16, 2016

(54) PREPARATION OF RUBBER CONTAINING SILICA AND CARBON BLACK REINFORCEMENT, RUBBER COMPOSITION AND TIRE WITH COMPONENT

(75) Inventors: Hans-Bernd Fuchs, Konz (DE); Tom Dominique Linster, Gilsdorf (LU); Léon Jean Mathias Gregorius, Useldange (LU); Jean-Claude Knepper, Ingeldorf (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 438 days.

(21) Appl. No.: 13/292,229

(22) Filed: Nov. 9, 2011

(65) Prior Publication Data

US 2012/0136110 A1    May 31, 2012

Related U.S. Application Data

(60) Provisional application No. 61/417,491, filed on Nov. 29, 2010.

(51) Int. Cl.
| | |
|---|---|
| *C08J 3/20* | (2006.01) |
| *C08L 21/00* | (2006.01) |
| *C08J 3/22* | (2006.01) |
| *C08K 3/04* | (2006.01) |
| *C08K 3/36* | (2006.01) |
| *C08K 5/548* | (2006.01) |

(52) U.S. Cl.
CPC .............. *C08L 21/00* (2013.01); *C08J 3/203* (2013.01); *C08J 3/226* (2013.01); *C08J 2321/00* (2013.01); *C08J 2421/00* (2013.01); *C08K 3/04* (2013.01); *C08K 3/36* (2013.01); *C08K 5/548* (2013.01)

(58) Field of Classification Search
CPC ... C08L 9/00; C08L 2310/00; C08L 2312/02; C08K 3/06; C08K 3/0033; C08K 3/0016; C08K 3/36
USPC ................. 524/492, 493, 495, 496, 573, 575; 523/351

See application file for complete search history.

(56) References Cited

U.S. PATENT DOCUMENTS

| | | | |
|---|---|---|---|
| 5,696,197 A | 12/1997 | Smith et al. | 524/495 |
| 5,773,504 A | 6/1998 | Smith et al. | 524/492 |
| 2006/0217475 A1* | 9/2006 | Cruse et al. | 524/261 |

FOREIGN PATENT DOCUMENTS

| | | | | |
|---|---|---|---|---|
| DE | 19959932 | 6/2001 | ............... | B60C 1/00 |
| EP | 728803 | 8/1996 | ............... | C08K 3/36 |
| EP | 814113 | 12/1997 | ............... | C08J 3/20 |

OTHER PUBLICATIONS

European Search Report completed Feb. 20, 2012.

* cited by examiner

*Primary Examiner* — Hannah Pak
(74) *Attorney, Agent, or Firm* — Henry C. Young, Jr.

(57) ABSTRACT

The invention relates to preparation of a rubber composition containing silica and carbon black reinforcement, the resultant rubber composition and tire with component comprised of such rubber composition.

2 Claims, 1 Drawing Sheet

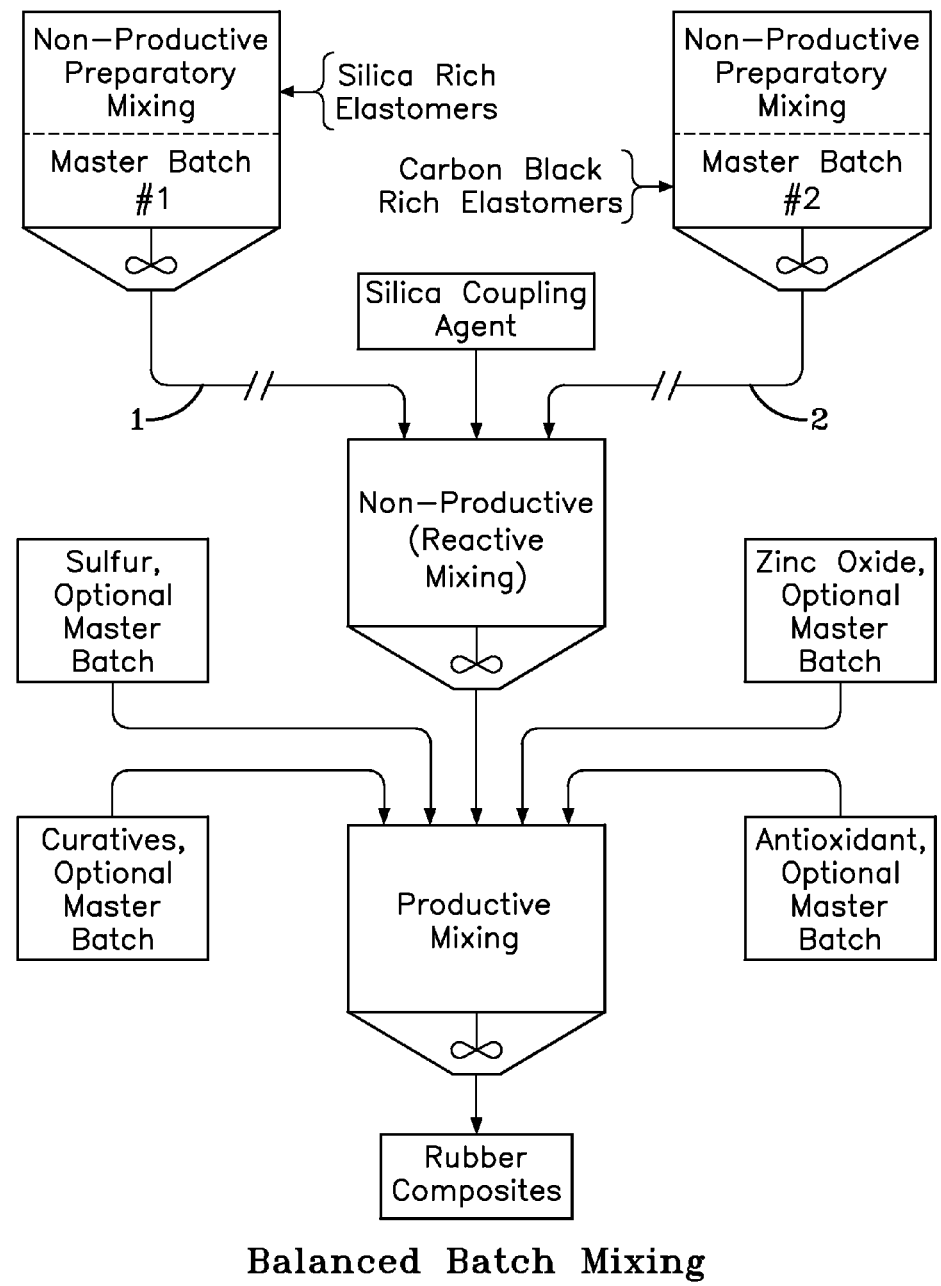
Balanced Batch Mixing

PREPARATION OF RUBBER CONTAINING SILICA AND CARBON BLACK REINFORCEMENT, RUBBER COMPOSITION AND TIRE WITH COMPONENT

The Applicants hereby claim the benefit of prior U.S. Provisional Application Ser. No. 61/417,491, filed on Nov. 29, 2010.

FIELD OF THE INVENTION

The invention relates to preparation of a rubber composition containing silica and carbon black reinforcement, the resultant rubber composition and tire with component comprised of such rubber composition.

BACKGROUND FOR THE INVENTION

Rubber compositions are sometimes prepared which contain a combination of particulate reinforcing filler comprised of amorphous, synthetic silica such as precipitated silica and fumed silica (sometimes referred to as precipitated and/or fumed silica) and rubber reinforcing carbon black.

A silica coupler is typically included to react with the precipitated and/or fumed silica surface and to interact with diene-based elastomers to thereby couple the silica to the rubber and aid in its reinforcement of the rubber.

Historically, rubber compositions have been prepared by blending separate and different rubber masterbatches which collectively contain combinations of silica and carbon black reinforcing fillers together with a silica coupler for the silica. Such separate rubber composition masterbatches may be, for example, a silica-rich rubber composition and a carbon black-rich rubber composition, for which at least one of the silica reinforcement containing rubber compositions also contains a silica coupler, and where the individual rubber masterbatches are subsequently mixed together. For example, see U.S. Pat. Nos. 5,696,197 and 5,773,504.

However, adding the silica coupler to the silica reinforcement-containing rubber creates a reactive mixture, namely a mixture where a moiety of the silica coupler is reactive with, and therefore reacts with, hydroxyl groups contained on the silica filler and another and different moiety of the silica coupler is interactive with diene-based elastomers.

In such circumstance, the rubber mixture must be mixed more carefully than conventional rubber mixtures such as, for example, by more carefully paying attention to and controlling a combination of mixing temperature profile parameters combined with appropriate mixing periods.

For this invention it is proposed to provide two rubber compositions, namely a silica-rich rubber compound and a carbon black-rich rubber compound without silica coupler and without sulfur curatives.

The silica-rich rubber compound would contain most, and perhaps all, of the silica reinforcement for the final rubber composition. The carbon black-rich rubber compound would contain most, and perhaps all, of the rubber reinforcing carbon black for the final rubber composition. None of these rubber compounds would contain the silica coupler so, in that sense, the two individual rubber compounds would not be silica coupler-containing reactive rubber compounds. Each of the rubber compounds could be prepared by mixing the respective rubber compounds in an internal rubber mixer or on an open cylindrical mill after which the two rubber compounds could be individually stored and would be mixed together in desirable ratios.

In the description of this invention, the terms "rubber" and "elastomer" where herein, are used interchangeably, unless otherwise provided. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art. The terms "cure" and "vulcanize" may be used interchangeably unless otherwise provided. In the description of this invention, the term "phr" refers to parts of a respective material per 100 parts by weight of rubber, or elastomer.

SUMMARY AND PRACTICE OF THE INVENTION

In accordance with this invention, a method of preparing a rubber composition comprises:

(A) Preparing a preparatory rubber composition in the absence of sulfur (e.g. at temperatures in a range of from about 130° C. to about 180° C.) by the steps comprised of:
 (1) preparing a plurality of at least two, and alternately from 2 through 4, individual and separate uncured rubber masterbatches each of which is comprised of blending and intimately dispersing reinforcing filler comprised of at least one of rubber reinforcing carbon black and synthetic silica reinforcing filler comprised of at least one of precipitated silica and fumed silica in elastomer(s) comprised of at least one conjugated diene-based elastomer, and
 (2) blending said all of said uncured rubber masterbatches together with a silica coupling agent, or silica coupler, to form a reactive rubber composition (during which the silica coupling agent reacts with said silica reinforcing filler to form a silica/coupler composite thereof) by:
  (a) blending at least two of said masterbatches together for which a silica coupling agent is blended therewith, following which the remainder of said masterbatches are blended therewith, or
  (b) blending at least two of said masterbatches together in the presence of a silica coupling agent following which the remainder of said masterbatches are blended therewith, and
(B) Preparing a productive rubber composition by blending a rubber cure package comprised of sulfur and at least one sulfur vulcanization accelerator with said reactive rubber composition (e.g. at a temperature in a range of from about 90° C. to about 130° C.).

In one embodiment, at least one of said masterbatches is a carbon black rich rubber masterbatch which contains rubber reinforcing filler comprised of:
 (A) rubber reinforcing carbon black, or
 (B) a combination of rubber reinforcing carbon black and amorphous synthetic silica (e.g. comprised of at least one of precipitated silica and fumed silica) of which more than 50 weight of said reinforcing filler is said rubber reinforcing carbon black.

In a further embodiment, at least one of said masterbatches is a silica rich rubber masterbatch which contains rubber reinforcing silica comprised of at least one of precipitated silica and fumed silica filler comprised of:
 (A) amorphous synthetic silica comprised of at least one of precipitated silica and fumed silica), or
 (B) a combination of synthetic silica comprised of at least one of precipitated silica and fumed silica and rubber reinforcing carbon black of which more than 50 weight of said reinforcing filler is said synthetic silica.

In practice said rubber masterbatches are cooled (e.g. allowed to cool under atmospheric conditions) to a temperature below about 40° C. prior to blending with said silica coupling agent, and said reactive rubber composition is cooled to a temperature below about 40° C. prior to preparing said productive rubber composition.

In a further embodiment of this invention, one or more of the following sub masterbatches are added in said productive rubber composition preparation:

(A) sulfur masterbatch comprised of sulfur and conjugated diene-based elastomer (e.g. natural cis 1,4-polyisoprene rubber);

(B) sulfur cure accelerator(s) masterbatch comprised of at least one sulfur cure accelerator and conjugated diene-based elastomer (e.g. natural cis 1,4-polyisoprene rubber); and (C) zinc oxide masterbatch comprised of zinc oxide and at least one conjugated diene-based elastomer (e.g. natural cis 1,4-polyisoprene rubber).

In additional accordance with this invention, the resultant rubber composition is shaped and cured in a suitable mold at an elevated temperature.

In further accordance with this invention, a sulfur cured rubber is provided as prepared by the method of this invention.

In additional accordance with this invention, an uncured tire component is formed comprised of an uncured rubber composition prepared by the method of this invention, built into an uncured tire assembly comprised of a plurality of uncured rubber components and the assembly shaped and cured in a suitable mold at an elevated temperature (e.g. temperature in a range of from about 140° C. to about 190° C.).

In further accordance with this invention, an uncured tire assembly is provided which is comprised of at least one component comprised of said uncured productive rubber composition.

In additional accordance with this invention, a tire is provided comprised of the uncured tire assembly which has been shaped and cured in a suitable mold (e.g. at an elevated temperature in a range of from about 140° C. to about 190° C.

Accordingly, a tire is provided having been prepared by the method of this invention.

A significant aspect of the invention is isolating the initial preparation of the preparatory rubber composition of which at least one of the rubber batches contains precipitated silica from a secondary preparatory rubber composition as a reactive rubber composition which contains the silica coupler, or silica coupling agent which defines the reactive rubber composition by its presence, all prior to formation of the final, productive rubber composition.

This is considered herein as being a significant evolution and departure from past practice in a sense of replacing a sequential materials addition by a parallel materials addition sequence. In such manner, then the preparation procedure (method) of this invention may comprise:

(A) preparation of the at least two preparatory non-productive rubber compositions which are decoupled from each other by being mixed separately from each other in individual rubber mixing apparatus following which they are removed from their individual mixing apparatus;

(B) preparation of the reactive rubber mixture which is decoupled from the preparation of the said at least two individual preparatory non-productive rubber mixtures by subsequently mixing the at least two preparatory non-productive rubber mixtures with a silica coupling agent in a rubber mixing apparatus to form a reactive rubber mixture in which said silica coupling agent reacts with said precipitated silica, following which said rubber mixture is removed from said rubber mixing apparatus;

wherein, optionally, said at least two of said at least two preparatory non-productive rubber mixtures first are mixed together in a rubber mixing apparatus and removed from said rubber mixing apparatus, and (C) preparation of a productive rubber mixture in a subsequent rubber mixer in which said resulting rubber mixed with a sulfur curative.

For a further understanding of the invention, a Drawing is provided as FIG. 1 in a form of a flow diagram which depicts the aforesaid step-wise balanced rubber masterbatch mixing procedure for preparing an uncured rubber composition.

THE DRAWING

In the Drawing, the rubber master batch mixing procedure is divided into a plurality of separate, individual initial non-productive preparatory masterbatch mixing separate and decoupled from each other followed by, with their individual masterbatch mixings being separate from and isolated, or decoupled, from, preparation of a reactive rubber mixture which is further decoupled and separate from a secondary preparatory, non-productive, reactive rubber mixing step which is then followed by a productive rubber mixing step.

For this Drawing, two separate and individual preparatory initial non-productive rubber masterbatch mixing steps are illustrated.

Significantly, the non-productive preparatory masterbatch mixing is required to be divided into two mixing phases, or steps, namely said initial at least two non-productive preparative mixing steps followed by a separate and isolated reactive rubber mixing step in which the silica coupling agent is added, then followed by a non-productive reactive mixing step.

In particular, it is seen in FIG. 1 that an initial preparatory non-productive silica-rich elastomer Master Batch No. 1 is prepared and that an initial preparatory non-productive carbon black-rich elastomer Master Batch No. 2 is separately prepared.

It is further seen in FIG. 1 that said Masterbatch No. 1 and Masterbatch No. 2 are mixed together in the next non-productive reactive rubber mixing stage in which a silica coupler is added to form the reactive rubber mixture. It is envisioned that the silica coupler reacts with the precipitated silica in this mixing stage to form a silica/coupler composite. In this sense, it is referred to as a reactive mixing stage to produce a reactive rubber composition.

Suitable mixing temperatures for the non-productive mixing steps are in a range of from about 140° C. to about 180° C., depending upon the rubber mixture being prepared.

After each of such non-productive mixing steps, the respective rubber mixture is cooled (allowed to cool under ambient room temperature conditions) to below about 40° C. so that it is ready for the next mixing step.

Thereafter, a productive mixing step is conducted where sulfur and sulfur cure accelerator(s) are added to (blended with) the aforesaid reactive rubber composition which may optionally also include addition of one or more of zinc oxide and antioxidant.

If desired, one or more of the sulfur, sulfur cure accelerator(s), zinc oxide and antioxidant ingredients may be added in a form of a masterbatch thereof of said ingredient and conjugated diene elastomer compatabilizer such as, for example, natural cis 1,4-polyisoprene rubber.

While certain representative embodiments and details have been shown for the purpose of illustrating the invention, it will be apparent to those skilled in this art that various changes and modifications may be made therein without departing from the spirit or scope of the invention.

The invention claimed is:

1. A method of preparing a rubber composition which comprises: (A) preparation of two separate uncured rubber masterbatches comprised of at least one conjugated diene-based elastomer and reinforcing filler comprised of at least one rubber reinforcing carbon black and precipitated silica, wherein (1) one of said prepared masterbatches is a carbon black masterbatch which contains reinforcing filler comprised of (a) rubber reinforcing carbon black or (b) combination of rubber reinforcing carbon black and precipitated silica of which more than 50 weight percent of said reinforcing filler is said rubber reinforcing carbon black, and (2) another of said prepared masterbatches is a precipitated silica rich masterbatch which contains reinforcing filler comprised of (a) precipitated silica, or (b) combination of precipitated silica and rubber reinforcing carbon black of which more than 50 weight percent of said reinforcing filer is said precipitated silica; (B) blending the two uncured rubber masterbatches together with a silica coupler to form a reactive rubber composition wherein the silica coupler reacts with said precipitated silica contained in said blended rubber masterbatches, wherein the reaction of silica coupler with the precipitated silica in the reactive rubber composition is thereby decoupled from the preparation of the individual rubber masterbatches, and (C) blending a sulfur cure package comprised of sulfur and at least one sulfur vulcanization accelerator with said rubber composition.

2. The method of claim 1 in which the prepared rubber composition is sulfur cured.

* * * * *